United States Patent [19]

Barriac

[11] Patent Number: 4,751,036
[45] Date of Patent: Jun. 14, 1988

[54] METHOD FOR PRODUCING A CLOSURE WITH A TAMPER INDICATING BAND

[75] Inventor: Jacques J. Barriac, Toledo, Ohio

[73] Assignee: Owens-Illinois Closure Inc., Toledo, Ohio

[21] Appl. No.: 95,789

[22] Filed: Sep. 14, 1987

[51] Int. Cl.⁴ ............................................. B29D 1/00
[52] U.S. Cl. .................................... 264/318; 249/63
[58] Field of Search .............. 264/268, 230, 313, 318; 425/809, DIG. 58; 249/59, 63, 67, 151–153, 66 R, 142; 215/252

[56] References Cited

U.S. PATENT DOCUMENTS

| | | | |
|---|---|---|---|
| 4,346,811 | 8/1982 | Hilaire | 249/59 |
| 4,497,765 | 2/1985 | Wilde et al. | 425/809 |
| 4,526,282 | 7/1985 | Dutt et al. | 215/252 |
| 4,552,328 | 11/1985 | Dutt et al. | 249/59 |
| 4,592,475 | 6/1986 | Hannon et al. | 215/252 |
| 4,622,198 | 11/1986 | Gallusser et al. | 249/59 |
| 4,664,278 | 5/1987 | Barriac | 215/252 |

FOREIGN PATENT DOCUMENTS 51-75756  6/1976  Japan .......................... 425/DIG. 58

*Primary Examiner*—Jan H. Silbaugh
*Assistant Examiner*—Jill L. Fortenberry

[57] ABSTRACT

An improved molded plastic closure having an integral tamper indicating band including a plurality of upwardly and inwardly extending tabs is disclosed. Also disclosed are an improved mold and molding process for the production of such a closure. The closure comprises an upper skirt portion and a lower tamper indicating band formed integrally with the upper skirt portion. Connected to the tamper indicating band and depending upwardly and inwardly therefrom are a plurality of tabs adapted to cooperate with an annular bead provided on a container finish. The tabs are molded in their upwardly and inwardly extending orientation so that free ends of the tabs terminate radially inwardly from an inner surface of the upper skirt portion. A two-piece core is used to form the inner surfaces of the upper skirt portion and the tamper indicating band. The tabs, in their as-molded orientation, are positioned to interfere with the core during removal of the closure therefrom. Such interference is eliminated, however, by a sleeve having tab engaging portions designed to deflect the tabs upwardly and radially outwardly from their molded positions where they will not interfere with the removal of the closure from the core. The core and the sleeve with tab engaging portions are then removed from the closure whereupon the tabs return to their as-molded positions extending upwardly and inwardly from the tamper indicating band through the inherent "memory" of the molded plastic.

5 Claims, 6 Drawing Sheets

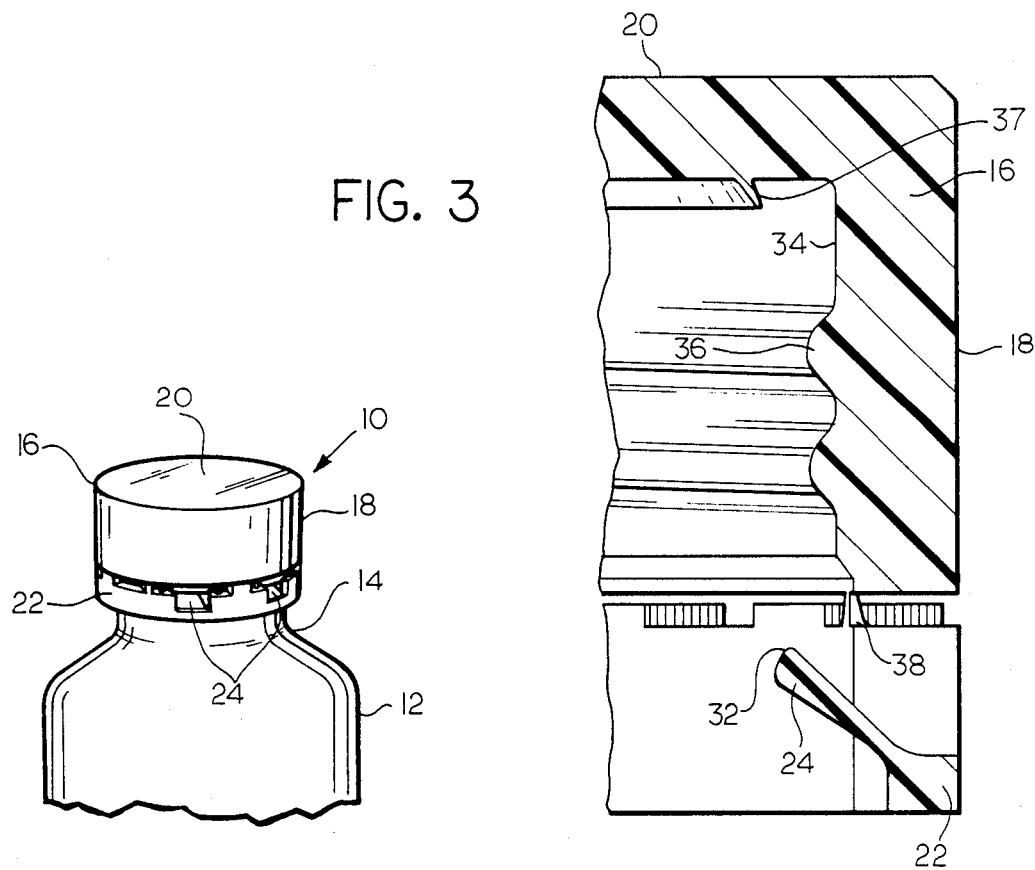
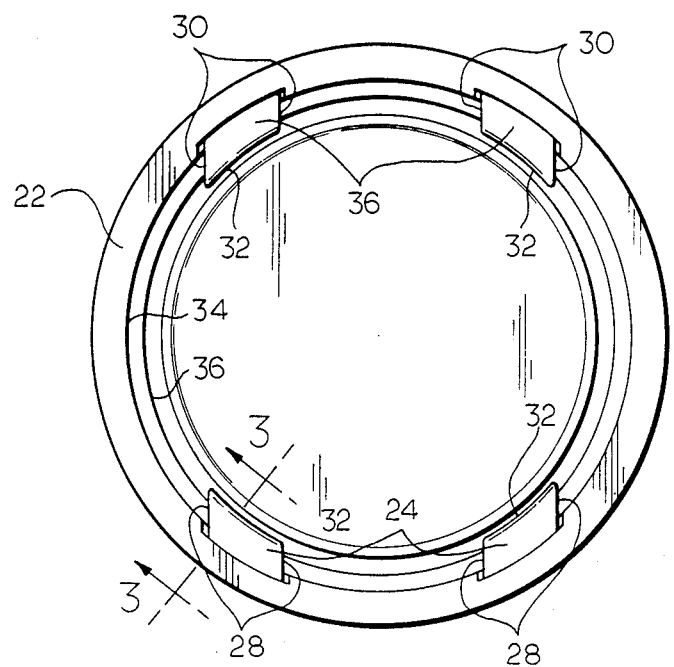
FIG. 3
FIG. 1
FIG. 2

METHOD FOR PRODUCING A CLOSURE WITH A TAMPER INDICATING BAND

BACKGROUND OF THE INVENTION

1. Field of the Invention

The present invention relates generally to a tamper indicating closure for a container finish. More specifically, the invention relates to a closure having an annular skirt connected to a tamper indicating band which is provided with a plurality of tabs that extend inwardly and upwardly therefrom to engage a bead on a container finish. The invention further relates to a method for producing such a closure wherein the tabs are molded in the inwardly and upwardly extending position where they would interfere with demolding the closure.

2. Discussion of the Prior Art

A wide variety of closures have been invented for the container industry. Closures in common use today include roll-on closures which are usually formed from sheet aluminum and plastic closures with tamper indicating bands of the heat shrink type or the mechanical type. Each type of closure is adapted to coact with an annular bead provided around the finish of a container so that removal or attempted removal of a closure will cause an easily detected distortion of the closure indicative of its condition.

The present invention deals generally with closures having tamper indicating bands of the mechanical type. Such closures comprise an upper skirt portion with a band attached to it by a plurality of slender, frangible bridges. The tamper indicating band is provided with tabs adapted to engage an annular bead provided on a container finish during removal of the closure. As the closure is removed, movement of the tamper indicating band is prevented by the tabs which engage the annular bead on the container finish and cause substantial tensile stresses to be transmitted through the frangible bridges to the end that the frangible bridges fracture thereby separating the tamper indicating band from the closure to provide a positive visual indication of the removal or attempted removal.

Examples of closures with mechanical tamper indicating bands are disclosed in numerous patents including U.S. Pat. Nos. 4,546,892, 4,550,844, 4,196,818, 4,598,833, 4,595,110, 4,511,054, 4,506,795, 4,488,655, 4,478,343 and 4,572,388. In addition, International Patent Cooperation Treaty Application Publication No. WO 83/04402 discloses a closure with a tamper indicating band including tabs extending inwardly and upwardly to engage an annular bead on a container finish.

It is known that the manufacturer of closures with tamper indicating bands presents numerous problems. Some of these problems are discussed at length in U.S. Pat. No. 4,592,475. As is explained in this patent, one of the most difficult problems in molding closures having integral tamper indicating bands including upwardly and inwardly extending tabs is the extraction of the closure from a mold. According to this patent, it has been proposed to provide a separate, outer mold member that projects inwardly through the tamper indicating band to form, on each upwardly and inwardly extending tab, the surface which faces upwardly and outwardly. The patent disclosure goes on to point up the difficulties arising from the necessarily complex mold arrangement required to produce a closure in this manner. The patent goes on to disclose a complex mold with a three-piece core for producing, by injection molding, a closure with an integral tamper indicating band having tabs which extend upwardly and inwardly therefrom when the closure is removed from the mold. This contrasts with many prior art one-piece closures including tamper indicating bands having upwardly and inwardly extending tabs wherein the tabs are initially molded in a position where they do not extend upwardly and inwardly but wherein one or more additional operations are performed, subsequent to the molding of the closures, to permanently deflect the tabs so that they extend upwardly and inwardly from the tamper indicating band. These additional operations add to the manufacturing expense that is incurred in manufacturing such closures, especially closures of the self-sealing or linerless type which do not require a subsequent lining operation of a type that can also include a tab repositioning step. An example of a linerless type closure is illustrated in U.S. Pat. No. 3,255,909.

SUMMARY OF THE INVENTION

The present invention is based upon the discovery of an improved molded plastic closure having an integral tamper indicating band including a plurality of upwardly and inwardly extending tabs. The present invention also resides in the discovery of an improved mold and molding process for the production of such a closure.

In one embodiment, a closure according to the present invention comprises an upper skirt portion and a lower tamper indicating band formed integrally with the upper skirt portion. Connected to the tamper indicating band and depending upwardly and inwardly therefrom are a plurality of tabs adapted to cooperate with an annular bead provided on a container finish. The tabs are molded in their upwardly and inwardly extending orientation so that free ends of the tabs terminate radially inwardly from an inner surface of the upper skirt portion. A two-piece core is used to form the inner surfaces of the upper skirt portion and the tamper indicating band. The tabs are molded in an upwardly and inwardly extending orientation so that a free end of each tab is positioned radially inwardly of the inner surfaces of the skirt and the band. The tabs, in their as-molded orientation, are positioned to interfere with the core during removal of the closure therefrom. However, according to the instant invention, such interference is eliminated by a sleeve having tab engaging portions designed to deflect the tabs upwardly and radially outwardly from their molded positions where they will not interfere with the removal of the closure from the core. The core and the sleeve with tab engaging portions are then removed from the closure whereupon the tabs return to their as-molded positions extending upwardly and inwardly from the tamper indicating band through the inherent "memory" of the molded plastic.

BRIEF DESCRIPTION OF THE DRAWINGS

FIG. 1 is a perspective view of a container, shown fragmentarily, capped with a closure in accordance with the present invention.

FIG. 2 is a bottom view, at an enlarged scale, of the closure of FIG. 1 with a tamper indicating band.

FIG. 3 is a sectional view at a further enlarged scale taken along the line 3—3 in FIG. 2.

DETAILED DESCRIPTION OF THE INVENTION

Figure 4:
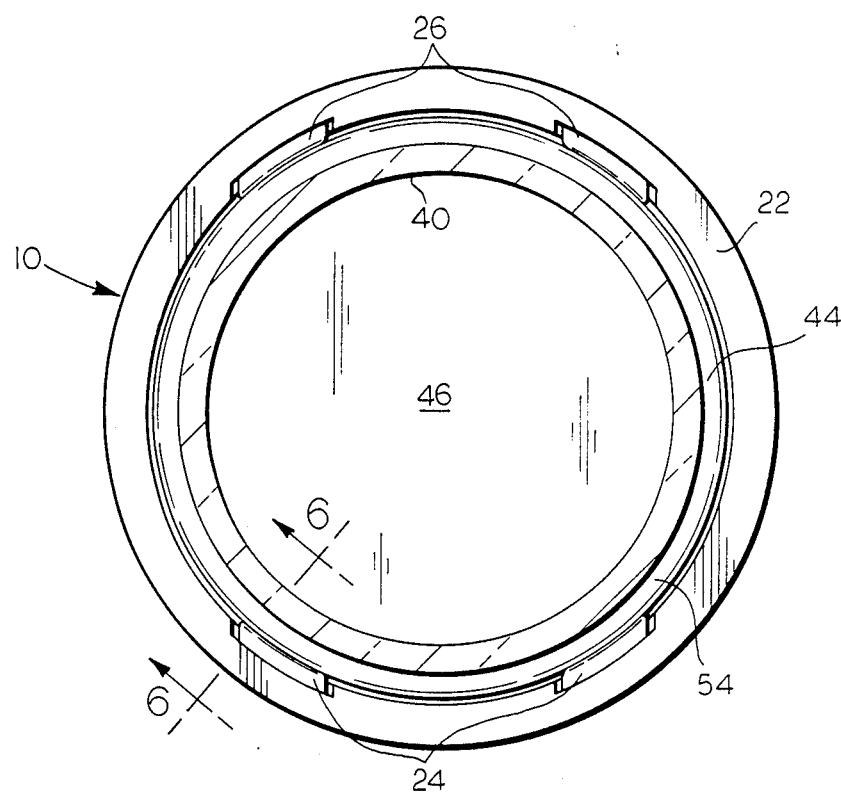
FIG. 4 is a bottom view through a sectioned container as a closure according to the present invention is being applied thereto.

With reference to FIG. 1, one embodiment of a closure in accordance with the present invention is indicated generally at 10. The closure 10 is shown in FIG. 1 applied to a container 12 having a finish including a narrowed down neck portion 14. The closure 10 comprises an upper skirt portion 16 having a sidewall 18 and a top 20. Connected to and depending downwardly from the upper skirt portion 16 is a tamper indicating band 22 which includes a pair of tabs 24 that extend radially inwardly and upwardly from the tamper indicating band 22. The closure 10 is formed from an injection moldable thermoplastic material such as high density polyethylene or polypropylene.

With reference to FIG. 2, a second pair of tabs 26 is illustrated. The tabs 26 are opposite the tabs 24. The tabs 24 and the tabs 26 have sides 28 and 30, respectively. Sides 30 of the tabs 26 are parallel to one another. Similarly, sides 28 of the tabs 24 are parallel to one another. In the embodiment shown in FIG. 2, the sides 28 and 30 extend in planes which are parallel to one another. Each of the tabs 24 and 26 terminate in a free end 32 which has a generally arcuate shape.

With reference to FIG. 3, one of the tabs 24 is shown depending from the tamper indicating band 22 upwardly, i.e. towards the top 20 of the upper skirt portion 16 and radially inwardly. As illustrated in FIGS. 2 and 3, the tabs 24 and 26 extend radially inwardly to the extent that the free ends 32 thereof are disposed radially inwardly of an interior surface 34 of the sidewall 18 and radially inwardly of threads 36 provided on the inner surface 34. An annular sealing fin 37 depends from the inside of the top 20 and is adapted to sealingly engage the rim of an associated container. A plurality of frangible bridges, one of which is indicated by reference numeral 38 in FIG. 3, integrally connect the upper skirt portion 16 to the tamper indicating band 22. The application of the closure 10 to a container finish is discussed below in connection with FIGS. 4, 5, 6 and 7.

Figure 6:
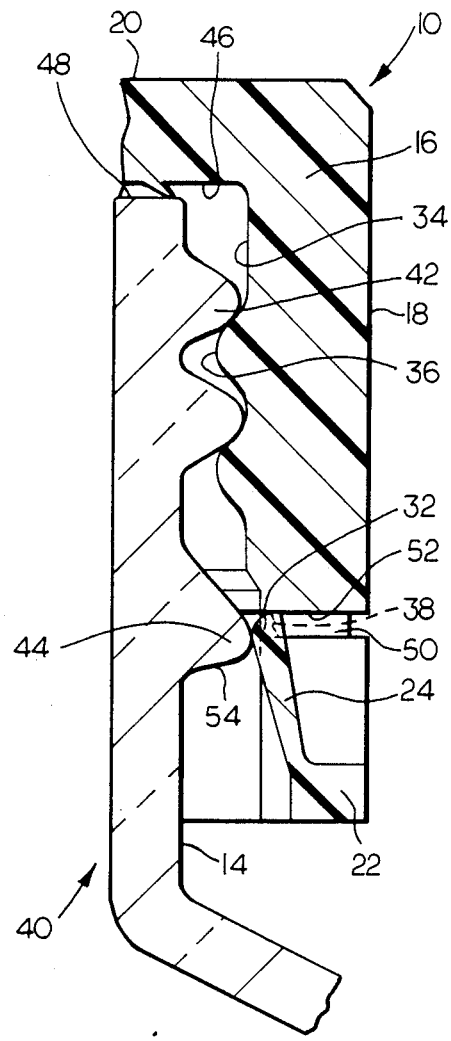
FIG. 6 is a sectional view, at an enlarged scale, taken along the line 6—6 of FIG. 4.

A container indicated generally at 40 is provided with external threads 42 and an annular bead 44 that projects radially outwardly from a narrowed down neck portion 14. FIGS. 4 and 6 illustrate the closure 10 just before its application to the container 40 is completed. As shown in FIG. 6, the annular sealing fin 37 inside of the top 20 has nearly engaged an upper rim surface 48 of the container 40. The tab 24 has been pivoted from the position illustrated for it in FIG. 3 upwardly, i.e. towards the top 20 of the closure 10, and radially outwardly by coaction with a portion of the annular bead 44. The application of the closure 10 to the container 40 causes compressive forces to act on the frangible bridges 38 connecting the tamper indicating band 22 to the upper skirt portion 16 of the closure 10. These compressive forces compress the frangible bridges 38 until tamper band supports 50 engage a lower edge 52 of the upper skirt portion 16 of the closure 10. Coaction between the tamper band supports 50 and the lower end 52 of the upper skirt portion 16 resists further compression of the frangible bridges 38 during application of the closure 10 to the container 40.

Figure 5:
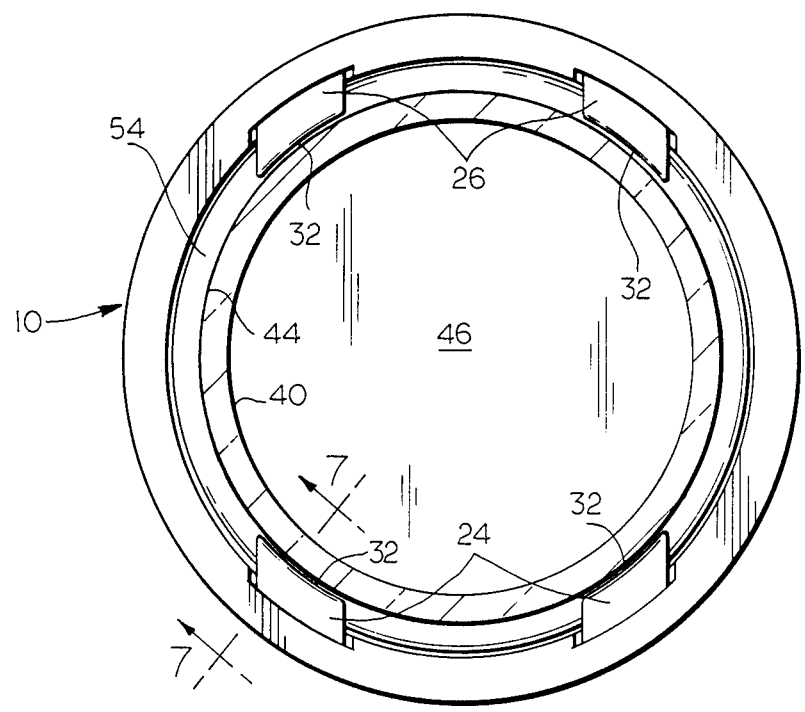
FIG. 5 is a view similar to FIG. 4 after the closure has been applied to the container finish.
Figure 7:
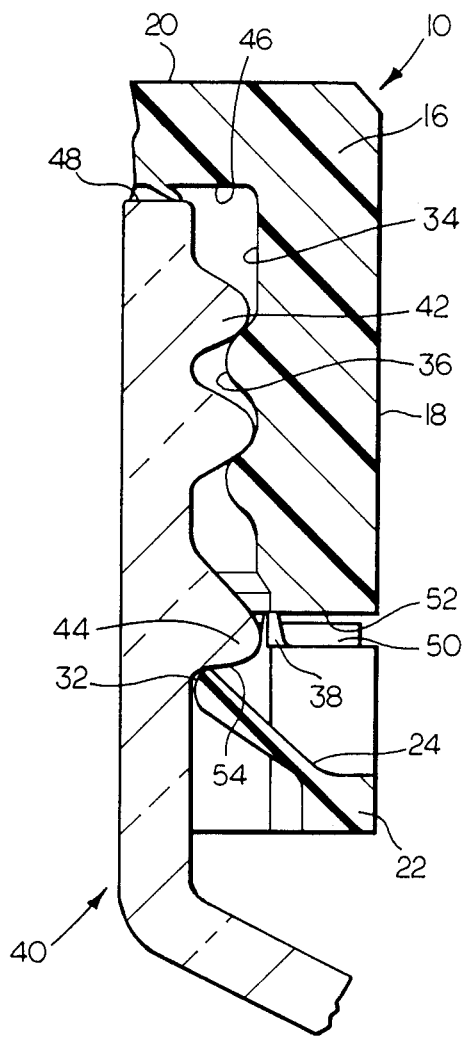
FIG. 7 is a fragmentary sectional view taken along the line 7—7 of FIG. 5.
Figure 8:
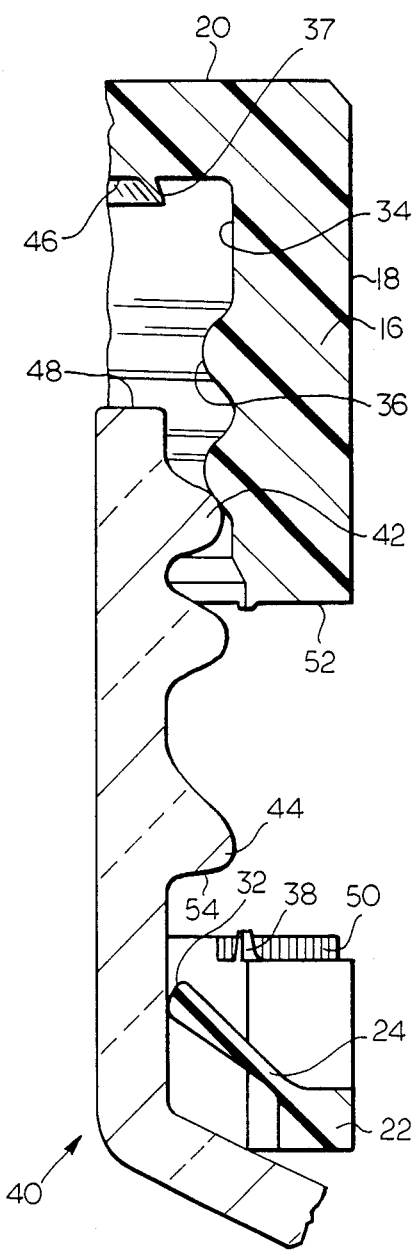
FIG. 8 is a sectional view through a portion of a container finish after a closure in accordance with the present invention has been partially removed to the extent that frangible bridges which connected the closure with a tamper indicating band have been broken.
Figure 9:
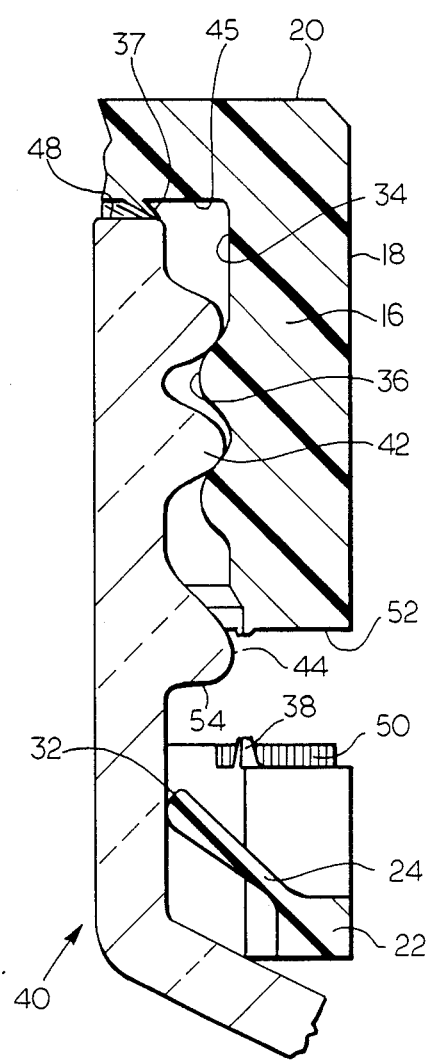
FIG. 9 is a sectional view similar to FIG. 8 wherein the closure has been replaced on the container finish.

FIGS. 5 and 7 illustrate the closure 10 and the container 40 after the completion of the application of the closure thereto. The annular sealing fin 37 inside of the top 20 is in sealing engagement with the upper rim surface 48 of the container 40. Additionally, the tabs 24 have pivoted from the position illustrated for them in FIGS. 4 and 6 to the position illustrated in FIGS. 3, 5 and 7. The free ends 32 of the tabs 24 and 26 are now in engagement with a lower surface 54 of the annular bead 44. During application of the closure 10 to the container 40, compressive forces acting through the frangible bridges 38 are relieved when the free ends 32 of the tabs 24 and 26 clear the annular bead 44. Removal or attempted removal of the closure 10 from the container finish 40 will be resisted by coaction between the free ends 32 of the tabs 24 and 26 with the lower surface 54 of the annular bead 44. The frangible bridges 38 are designed to shear under the loads that result from such removal or attempted removal, thereby separating the tamper indicating band 22 from the upper skirt portion 16 of the closure 10. This is illustrated in FIG. 8 where the closure 10 has been partially removed from the container 40 and the frangible bridges 38 have sheared thereby separating the tamper indicating band 22 from the upper skirt portion 16. The tamper indicating band 22 is at rest on the container 40. The upper skirt portion 16 can be replaced on the container 40 to reseal the container as illustrated in FIG. 9.

Figure 10:
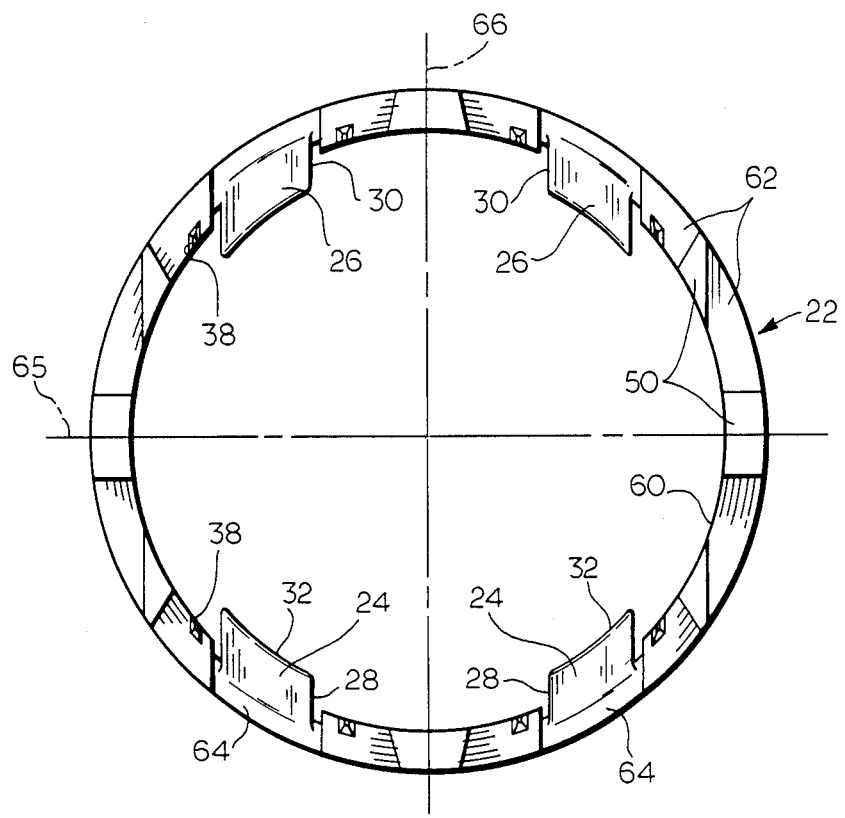
FIG. 10 is a top view of a tamper indicating band which is detached from a closure of the present invention.
Figure 11:
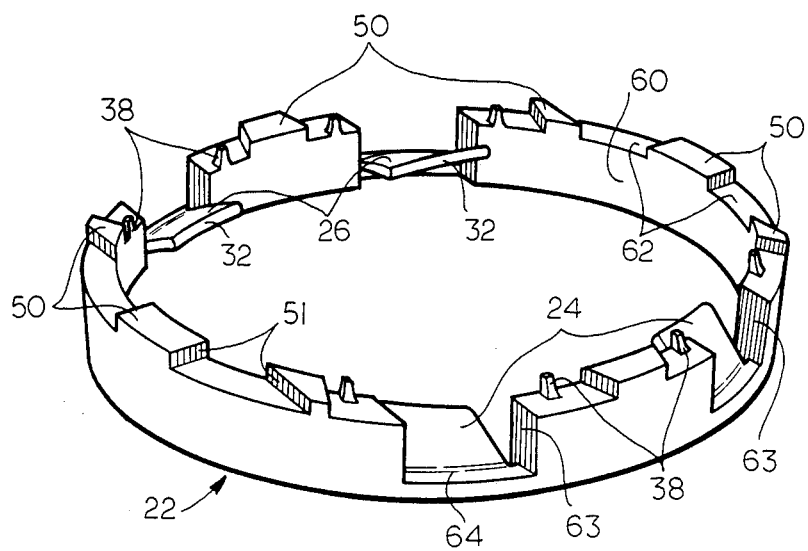
FIG. 11 is a perspective view of the tamper indicating band shown in FIG. 8.

Details regarding the construction of the tamper indicating band 22 are illustrated in FIGS. 10 and 11 where the tamper indicating band 22 is shown after separation from the upper skirt portion 16 of the closure 10. The tamper indicating band 22 has a generally cylindrically shaped interior surface 60, the circumference of which is at least equal to and preferably slightly greater than the circumference of the annular bead of a given container finish. The free ends 32 of the tabs 24 and 26 are positioned radially inwardly from the inner surface 60 of the tamper indicating band 22.

The tamper indicating band 22 has an upper, major surface 62 which is interrupted at spaced points by eight frangible bridges 38, eight tamper band supports 50 having sides 51 and four windows housing the tabs 24 and 26 Each window is defined by sides 63 and a lower ledge 64. The frangible bridges 38 extend upwardly from the upper major surface of the tamper indicating band 22 a distance which is slightly greater than the height of the tamper band supports 50. The number and location of frangible bridges 38 and tamper band supports 50 can be varied substantially from the embodiment illustrated in FIGS. 8 and 9 while maintaining the functions thereof. For example, U.S. Pat. No. 4,664,278 discloses other suitable configurations for frangible bridges and tamper band supports. The frangible bridges 38 are tapered so that their largest cross section is immediately adjacent to the band 22.

In FIGS. 10 and 11, the tamper indicating band 22 is shown to be symmetrical with respect to two vertical planes; one which bisects the tamper indicating band along a line indicated by reference numeral 65 and a second plane which bisects it along a line which is indicated by reference numeral 66. The symmetry of the tamper indicating band 22 is a consequence of a molding process for producing a closure 10 including the tamper indicating band 22. The molding process is discussed below in more detail in connection with FIGS. 12 through 15.

FIGS. 12 through 15 illustrate various stages of a process for molding a closure 10 in a multiple piece mold indicated generally at 70. The mold 70 comprises a two-piece core consisting of a main core 72 and a core sleeve 74. The main core 72 and the core sleeve 74 are mounted to permit limited axial movement therebetween in a manner described more fully below. The mold 70 comprises an outer mold portion 76 configured to form the exterior surfaces of the upper skirt portion 16 of the closure 10. The mold 70 further comprises a pair of tamper indicating band split mold sections, a portion of one being illustrated in FIG. 12 and designated by reference number 78. The mold 70 additionally includes a stripping sleeve 80 which is coaxially mounted for limited axial movement relative to the main core 72 and the core sleeve 74.

Figure 12:
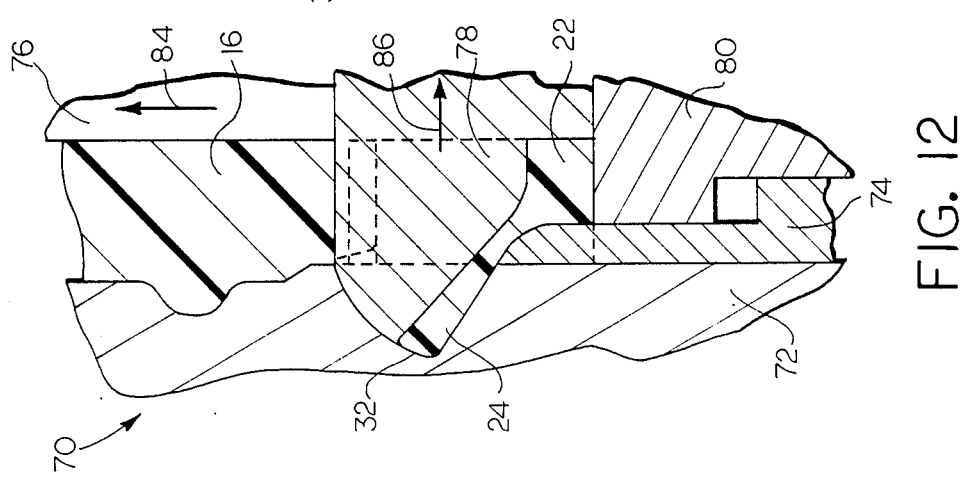
FIG. 12 is a fragmentary sectional view through a portion of a closed closure mold after injection of a molding composition.

The components of the mold 70 are shown in FIG. 12 in a closed position after a molding composition has been injected into the cavity of the mold 70. Preferably, the molding composition is a polymeric material with an elastic memory. High density polyethylene and polypropylene are polymeric materials which have such a property and which are otherwise suitable for use in the manufacture of closures for various purposes. In any event when the molding composition has set in the mold cavity of the mold 70, the closure can be removed from the mold 70 in the manner described below.

Figure 13:
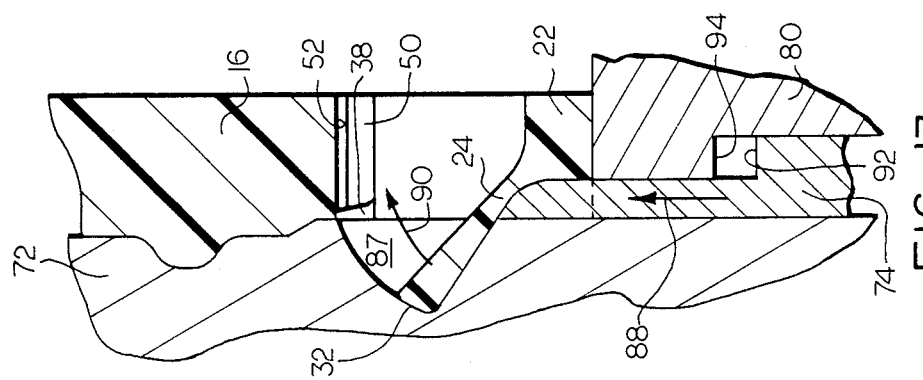
FIG. 13 is a view similar to FIG. 12 after a split portion of the mold has been withdrawn.

The outer mold portion 76 of the mold 70 is displaced upwardly in the general direction of arrow 84 and the tamper indicating band split mold section 78 is displaced radially outwardly from the mold 70 in the general direction of arrow 86. This results in the arrangement of components of the mold 70 that is illustrated in FIG. 13 wherein the tab 24 is in a cavity 87 where it will interfere with removal of the closure 10 from the core 72. This interference is eliminated by the core sleeve 74 as it is advanced upwardly in the general direction of arrow 88 causing a displacement of the tab 24 in a radially outward direction generally indicated by an arrow 90. Advancement of the core sleeve 74 is continued until a shoulder 92 thereon abuts a corresponding shoulder 94 provided on the stripping sleeve 80. At this time, the components will be in the relative positions illustrated in FIG. 14 where the tab 24 is in a substantially vertical position in which it will not interfere with the core 72 during removal of the closure 10 therefrom. The free end 32 of the tab 24 is out of the cavity 87.

Figure 15:
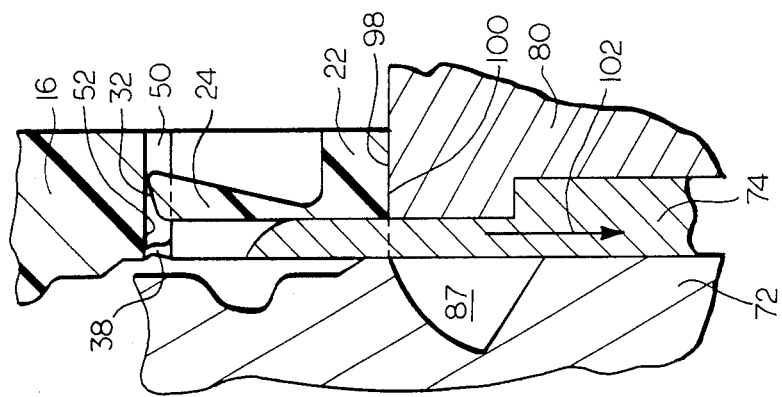
FIG. 15 is a sectional view similar to FIG. 14 after a stripper sleeve has disengaged a closure from a core.
Figure 14:
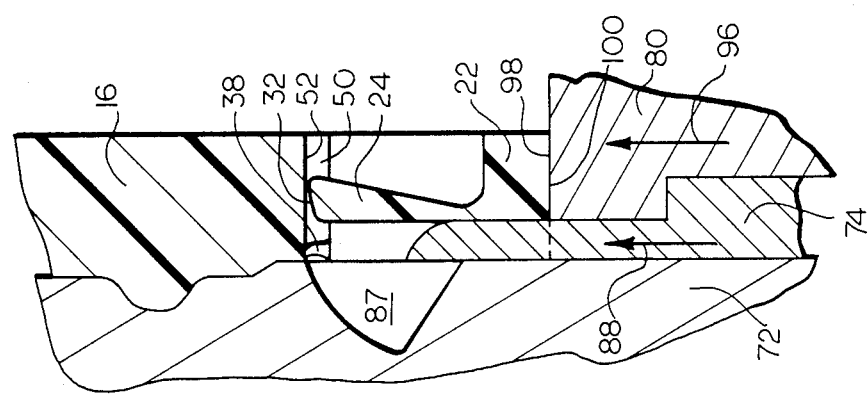
FIG. 14 is a view similar to FIG. 13 after a tab sleeve has been moved upwardly along the longitudinal axis of the mold to deflect a tab upwardly.

Movement of the core sleeve 74 in the direction of arrow 88 is continued after the shoulder 92 of the core sleeve 74 engages the shoulder 94 of the stripping sleeve 80 causing a corresponding movement of the stripping sleeve 80 in the direction of the arrow 96. An upper surface 98 of the stripping sleeve 80 is positioned to engage a lower surface 100 of the tamper indicating band 22 and displace the tamper indicating band in the general direction of arrows 88 and 96. This results in compressive forces acting on the frangible bridges 38 which compress until each of the tamper band supports 50 engages a lower surface 52 of the upper skirt portion 16 of the closure 10. Movement of the core sleeve 74 and the stripper sleeve 80 in the direction of arrows 88 and 96 is continued until the closure 10 is stripped from the core 72 of the mold 70 as illustrated in FIG. 15. Finally, the core sleeve 74 is moved downwardly with respect to the stripping sleeve 80 in the general direction of arrow 102. Withdrawal of the core sleeve 74 releases the tab 24 to return to its as molded position, i.e. extending upwardly and radially inwardly from the tamper indicating band 22 as shown in FIGS. 10 and 11.

In accordance with the present invention, it is contemplated that a first tamper indicating band split mold section would include molding surfaces for forming all of the tamper indicating band surfaces shown in FIG. 10 on one side of the line 65 and, additionally, the surfaces corresponding with the sides 51 of the tamper band supports 50 and the sides 63 of the tab windows. Similarly, a second split mold section would be provided to form the identical tamper indicating band surfaces on the other side of the line 65 in FIG. 10 along with the surfaces corresponding with the sides 51 of the tamper band supports and the sides 63 of the tab windows. Accordingly, the first tamper indicating band split mold section would include molding surfaces for forming a portion of both tabs 24 while the second tamper indicating band split mold section would include molding surfaces for forming a portion of both tabs 26. This configuration for a pair of split mold sections leads to the parallel relationship between the sides 28 of the tabs 24 as well as the parallel relationship between the sides 30 of the tabs 26. This parallel relationship allows for easy withdrawal of each tamper indicating band split mold section after molding. The use of two such split mold sections leads to the parallel relationship between the sides 30 and the sides 28 of the tabs 26 and 24, respectively. The principals of the present invention can be readily applied to such other split mold section configurations as will be apparent to those skilled in the molding arts.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the following claims.

I claim:

1. A method for producing a closure comprising an upper skirt, a tamper indicating band and a plurality of frangible bridges integrally connecting said tamper indicating band to said upper skirt, a plurality of container finish engaging tabs each connected to and extending upwardly towards said skirt and radially inwardly from said band to a free end, said method comprising the steps of positioning a plurality of mold components including a mold core to form a closure cavity including a plurality of tab cavities for molding each of said tabs in a first position extending upwardly towards said skirt and radially inwardly from said band to said free end, said mold core including recesses for forming said free ends of said tabs, said first position being one in which said tabs will interfere with the removal of said closure from the core;

injecting a thermoplastic molding composition having elastic memory properties into said closure cavity;

advancing a sleeve having tab engaging portions to deflect said tabs radially outwardly to a second position where they will not interfere with the removal of the closure from the mold core;

removing said closure from said core and disengaging said sleeve from said tabs, thereby enabling the tabs to return to said first position.

2. The method as claimed in claim 1 wherein said mold components include at least two split mold sections having tab cavity forming surfaces and wherein a portion of each tab cavity forming surface is positioned within a corresponding recess in the mold core when the mold components are positioned to form a closure cavity.

3. The method as claimed in claim 2 wherein the step of positioning said mold components includes the step of advancing said split mold sections from diametrically opposed positions relative to said mold core towards said mold core.

4. The method as claimed in claim 1 wherein said sleeve is telescopically mounted on said mold core for limited axial movement relative to said core.

5. A method for producing a closure comprising an upper skirt, a tamper indicating band and a plurality of frangible bridges integrally connecting said tamper indicating band to said upper skirt a plurality of container finish engaging tabs each connected to and extending upwardly towards said skirt and radially inwardly from said band to a free end, said method comprising the steps of positioning a plurality of mold components including a mold core, a sleeve mounted concentrically about the mold core for limited axial movement thereon and at least two split mold sections, to form a closure cavity including a plurality of tab cavities for molding each of said tabs in a first position extending upwardly towards said skirt and radially inwardly from said band to said free end, said mold core including recesses for forming at least a portion of said free ends of said tabs, said first position being one in which said tabs will interfere with the removal of said closure from the core, said split mold sections including a tab forming surface which, in combination with the recesses in the mold core, define the tab cavities, injecting a thermoplastic molding composition having elastic memory properties into said closure cavities, withdrawing said split mold sections from said mold core, advancing a sleeve having tab engaging portions to deflect said tabs radially outwardly to a second position where they will not interfere with the removal of the closure from the mold core, removing said closure from said core, disengaging said sleeve from said tabs, thereby enabling the tabs to return to said first position.

* * * * *